Sept. 13, 1955     L. C. ANDERSEN     2,717,654
INFLATABLE FRICTIONAL DRIVE MEANS
FOR TANDEM AXLE VEHICLES
Filed Feb. 16, 1954
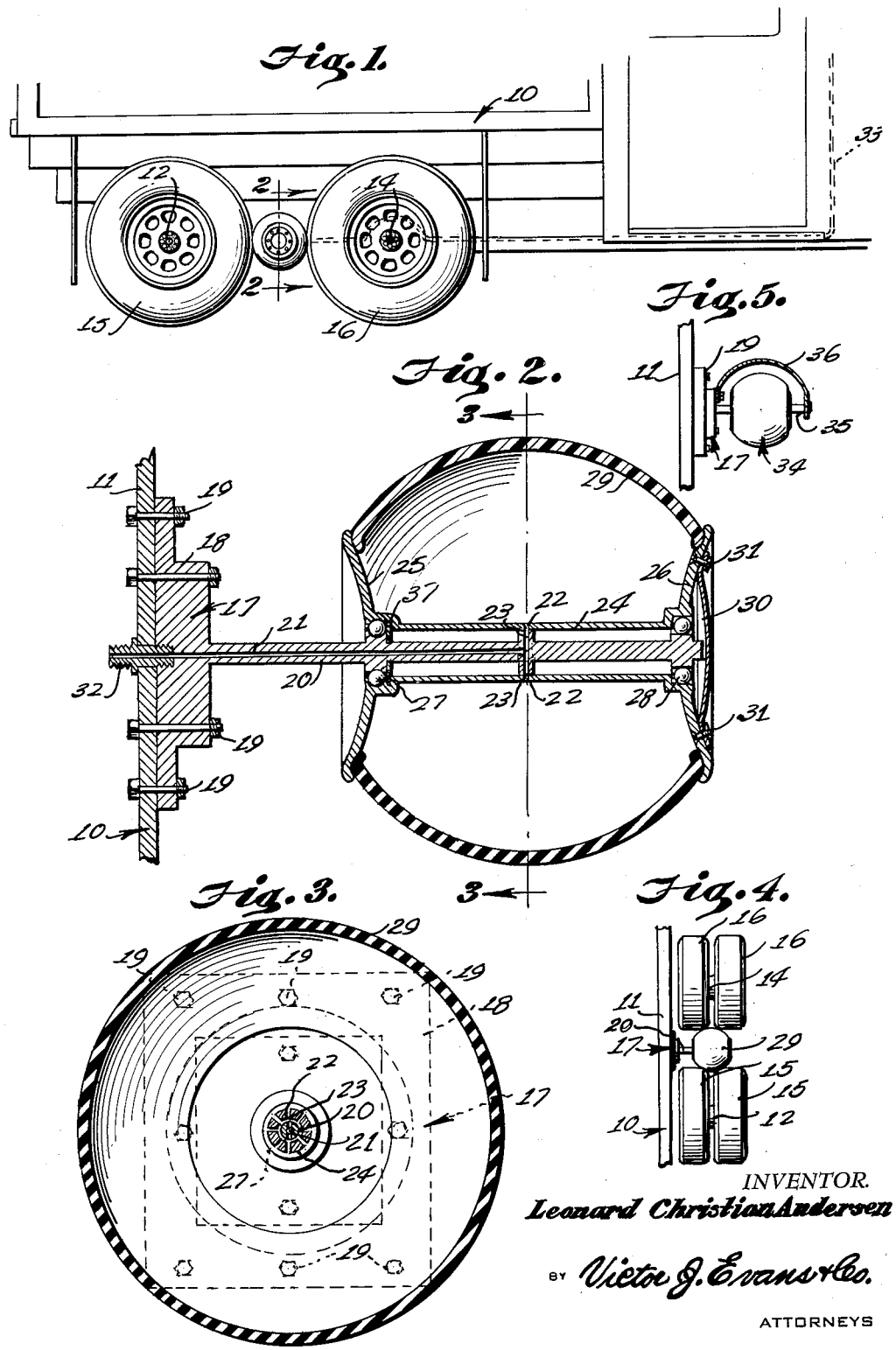
INVENTOR.
*Leonard Christian Andersen*
BY *Victor J. Evans & Co.*
ATTORNEYS

United States Patent Office 2,717,654
Patented Sept. 13, 1955

2,717,654

INFLATABLE FRICTIONAL DRIVE MEANS FOR TANDEM AXLE VEHICLES

Leonard Christian Andersen, Richfield, Minn.

Application February 16, 1954, Serial No. 410,640

2 Claims. (Cl. 180—22)

This invention relates to a vehicle, such as a multi-wheeled truck or tractor, and more particularly to a traction pulley for transmitting power from the drive wheels of a truck or tractor to the wheels without power.

The object of the invention is to provide a traction pulley which is adapted to be actuated when additional traction is needed by the vehicle, as for example upon icy or muddy roads.

Another object of the invention is to provide an inexpensive and efficient means of transmitting power from the drive wheels of a tandem axle truck or tractor to the wheels without power which are mounted on the "dead axle."

A further object of the invention is to provide a traction pulley which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of a truck showing the traction pulley of the present invention in inflated position and engaging the wheels of the vehicle.

Figure 2 is a longitudinal sectional view taken on the line 2—2 of Figure 1.

Figure 3 is a sectional view taken on the line 3—3 of Figure 2.

Figure 4 is a plan view showing the traction pulley engaging two pairs of wheels.

Figure 5 is a view showing a modification wherein a bracket is provided for supporting an additional support for the traction pulley shaft.

Referring in detail to the drawings, the numeral 10 designates a portion of a vehicle which may be a truck or tractor, Figure 1, and the vehicle 10 includes a frame 11. A pair of axles 12 and 14 are journaled in the frame 11, and one or more wheels 15 which may be drive wheels are journaled on the axle 12, while one or more wheels 16 are journaled on each end of the axle 14, Figures 1 and 4.

Secured to the frame 11 is the base 18 of a body member 17, Figure 2. The body member 17 can be secured to the frame 11 in any suitable manner, as for example by bolt and nut assemblies 19. Extending outwardly from the body member 17 is a stem 20, and the body member 17 is provided with a longitudinally extending passageway 21 which is adapted to be connected to a suitable source of air pressure. The air pressure leading to the passageway 21 can be controlled by a suitable valve arranged on the dashboard of the vehicle. Rotatably mounted on the projecting end of the stem 20 is a sleeve 24, and the sleeve 24 is provided with a plurality of openings 22 which register with openings 23 in the stem 20, and the openings 23 communicate with the passageway 21.

Extending from the rotatable sleeve 24 is a pair of rims 25 and 26, and a bearing race 27 is interposed between the rim 25 and the adjacent portion of the stem 20. A similar bearing race 28 is interposed between the other rim 26 and the end portion of the stem 20. Extending between the pair of rims 25 and 26 and supported thereby is an inflatable casing 29 which can be made of any suitable material such as rubber. A cap 30 is detachably connected to the rim 26 by suitable securing elements such as the bolt and nut assemblies 31, and the cap 30 serves to protect and enclose the projecting end of the stem 20.

Arranged in engagement with a portion of the frame 11 and communicating with the passageway 21 is a bushing 32, Figure 2, and the bushing 32 is connected to a conduit or line 33 which can lead to a suitable tank holding air under pressure and as previously stated a valve on the dashboard of a vehicle can be used for controlling the flow of air into and out of the inflatable casing 29 through the passageway.

Referring to Figure 5 of the drawings there is shown a slightly modified form of the invention wherein the traction pulley is indicated generally by the numeral 34. In this form of the invention the traction pulley 34 is mounted on a shaft or stem 35, and a bracket 36 has one end connected to the projecting end of the stem 35 and its other end secured to the base of the body member 17. The bracket 36 provides an additional support for the stem 35 and pulley 34.

From the foregoing it is apparent that a traction pulley has been provided which will deliver power from drive wheels such as the wheels 15, to the other wheels 16 as when additional traction is required as for example on icy or muddy roads. Normally the casing 29 will be deflated so that it will not frictionally engage the wheels 15 and 16, but when it is necessary to have extra traction air can be supplied to the interior of the casing 29 through the passageway 21 to thereby inflate the casing 29 to the position shown in the drawings. With the casing 29 inflated it will simultaneously frictionally engage the wheels 15 and 16 as shown in Figures 1 and 4 so that drive from the wheels 15 will be transmitted through the casing 29 to the wheels 16 so that extra traction will be supplied. When the casing 29 is not being used a suitable valve on the dashboard or other locality can be actuated to thereby release air in the casing 29 so that only the wheels 15 will be acting as drive wheels.

With the present invention power will be transmitted from the drive wheels of a tandem axle truck or tractor to the wheels without power which are mounted on the "dead axle." Usually some trucks are built with the drive on both axles but the extra differential and drive line is expensive and there is a loss of power due to the extra gears and bearings and upkeep is more costly and there is added weight. The disadvantage of a single drive tandem axle truck or tractor is the loss of traction on icy roads or in snow but with the present invention this disadvantage is eliminated in an inexpensive manner and with little additional weight. The pulley of the present invention is used only when needed and can be controlled from within the cab when the truck is in motion or standing still. When more traction is needed such as on an icy hill the driver can open a suitable air valve in the cab which will inflate the tubeless tire 29 on the traction pulley to thereby cause contact under approximately 100 pounds pressure between the drive wheels and the ones without power to thereby transmit power from the drive wheels to the dead ones. When the traction is no longer needed the air can be released and the tire 29 on the traction pulley will shrink away from the truck tires and will be inactive. The air can be supplied from the air tank which operates the brakes.

A U-shaped brace 36 provides added strength and stability and as shown in Figure 4 the casing 29 can be arranged so that it contacts all four wheels and the casing 29 can be designed and shaped to provide maximum contact and traction. Also a shield or fender could be extended from the truck frame over the traction pulley to prevent ice and snow from building up on the pulley when it is not in use.

The sleeve 24 is of a size so that it can be removed from the stem or assembled thereon. The sleeve 24 does not contact the stem except through the ball bearings 27. Further, there is provided an air seal to keep the air from leaking out through the inside bearings 27 and this bearing seal is indicated by the numeral 37. The cover 30 will also seal the other end of the device to prevent leakage of air from the outer end thereof.

I claim:

1. In a vehicle including a frame, drive and secondary wheels journaled on said frame, a body member secured to said frame between said wheels, said body member including a stem extending outwardly from said body member, a passageway extending through said body member and stem and adapted to be connected to a source of air under pressure, a sleeve rotatably mounted on said stem, bearing races interposed between the end portions of said sleeve and said stem, a rim extending outwardly from each end of said sleeve, a resilient casing extending between said pair of rims, a plurality of openings in said sleeve and in communication with said passageway for establishing communication between said passageway and the interior of said casing, and a cap secured to the outermost of said rims, said stem extending from said body member into the plane of the drive and secondary wheels and positioned between said wheels, said casing in its inflated position simultaneously frictionally engaging the drive and secondary wheels, said casing in its deflated position being out of frictional engagement with said wheels.

2. In a vehicle including a frame, drive and secondary wheels journaled on said frame, a body member secured to said frame, said body member including a stem extending from said body member, said body member having a passageway extending therethrough adapted to be connected to a source of air under pressure, a sleeve rotatably mounted on said stem, a rim extending from each end of said sleeve, a resilient casing extending between said rims, there being a plurality of openings in said sleeve communicating with said passageway, there being openings in said stem establishing communication between said passageway and the interior of said casing, and a cap secured to the outermost of said rims, said stem extending from said body member into the plane of the drive and secondary wheels and positioned between said wheels, said casing in its inflated position simultaneously frictionally engaging the drive and secondary wheels, said casing in its deflated position being out of frictional engagement with said wheels.

References Cited in the file of this patent

UNITED STATES PATENTS

| | | |
|---|---|---|
| 676,409 | Berger | June 18, 1901 |
| 1,394,328 | Miller | Oct. 18, 1921 |
| 1,436,373 | Walk | Nov. 21, 1922 |
| 1,897,944 | Carter | Feb. 14, 1933 |
| 2,380,181 | Krenzien | July 10, 1945 |

FOREIGN PATENTS

| | | |
|---|---|---|
| 242,476 | Switzerland | Nov. 16, 1946 |